(12) United States Patent
Zimmermann

(10) Patent No.: US 10,898,961 B2
(45) Date of Patent: Jan. 26, 2021

(54) DEVICE AND METHOD FOR ROUGHING AND FINE-MACHINING OF GEARS

(71) Applicant: Profilator GmbH & Co. KG, Wuppertal (DE)

(72) Inventor: Jonathan Zimmermann, Essen (DE)

(73) Assignee: Profilator GmbH & Co. KG, Wuppertal (DE)

( * ) Notice: Subject to any disclaimer, the term of this patent is extended or adjusted under 35 U.S.C. 154(b) by 122 days.

(21) Appl. No.: 16/060,320

(22) PCT Filed: Dec. 7, 2016

(86) PCT No.: PCT/EP2016/079991
§ 371 (c)(1),
(2) Date: Nov. 9, 2018

(87) PCT Pub. No.: WO2017/097796
PCT Pub. Date: Jun. 15, 2017

(65) Prior Publication Data
US 2019/0061030 A1    Feb. 28, 2019

(30) Foreign Application Priority Data
Dec. 10, 2015   (DE) .......................... 10 2015 121 523

(51) Int. Cl.
*B23F 17/00*         (2006.01)
*B23F 21/00*         (2006.01)
(Continued)

(52) U.S. Cl.
CPC ............ *B23F 17/006* (2013.01); *B23F 5/163* (2013.01); *B23F 21/005* (2013.01); *B23F 21/122* (2013.01)

(58) Field of Classification Search
CPC ...... B23F 5/163; B23F 17/006; B23F 21/005; B23F 21/122; B23F 21/16; B23F 21/02
See application file for complete search history.

(56) References Cited

U.S. PATENT DOCUMENTS 2,258,849 A    10/1941   Erhardt

FOREIGN PATENT DOCUMENTS

DE         3930322 C1    9/1990
DE       19918289 A1   10/2000
(Continued)

OTHER PUBLICATIONS

English translation of DE102014118703 (Year: 2014).*
(Continued)

*Primary Examiner* — Alan Snyder
(74) *Attorney, Agent, or Firm* — Whitmyer IP Group LLC

(57) ABSTRACT

A method for cutting teeth into working gears using a tool, the tool main part of which has a plurality of cutting teeth which are arranged about a rotational axis and which protrude radially from the tool main part, the cutting teeth forming an end face, two tooth flanks which point away from each other, and cutting edges. The cutting edges are formed from the tooth flank edges adjoining the end face. In a first method step, tooth gaps which form tooth flanks are produced in the working gear by means of the cutting edges using a machining process in a first position of the tool relative to the working gear, and in a second method step, the working gear tooth flanks produced by the cutting edges are fine-machined by an abrasive tool surface.

15 Claims, 6 Drawing Sheets

(51) Int. Cl.
   *B23F 21/12* (2006.01)
   *B23F 5/16* (2006.01)

(56) References Cited

FOREIGN PATENT DOCUMENTS

| DE | 10305752 | A1 | | 10/2004 | | |
|---|---|---|---|---|---|---|
| DE | 102005049528 | A1 | | 5/2007 | | |
| DE | 102009003338 | A1 | | 7/2010 | | |
| DE | 102014118703 | A1 | * | 6/2016 | ............. | B23F 5/163 |
| DE | 102015106354 | A1 | | 6/2016 | | |
| EP | 2022576 | A1 | | 2/2009 | | |
| EP | 2570217 | A1 | | 3/2013 | | |
| WO | 0160733 | A1 | | 8/2001 | | |

OTHER PUBLICATIONS

Partial human translation of DE102014118703A1. (Year: 2016).*
Fette Gmbh: "Fräsen and Entgraten in einem Arbeitsgang. CHAMFER-CUT Cutting and Deburring in One Process. CHAMFER CUT", Jan. 1, 2004 (Jan. 1, 2004), pp. 1-6, 6 pages.
International Search Report and Translation Application No. PCT/EP2016/079991 Completed: Feb. 28, 2017; dated Mar. 8, 2017 7 pages.
Written Opinion of the International Searching Authority Application No. PCT/EP2016/079991 Completed: Feb. 28, 2017 7 pages.

* cited by examiner

DEVICE AND METHOD FOR ROUGHING AND FINE-MACHINING OF GEARS

TECHNICAL FIELD

The invention relates to a method for cutting teeth into working gears with a tool, the main part of which has a multiplicity of teeth, which are arranged about an axis of rotation, and which protrude radially from the main part of the tool, which cutting teeth have an end face, two tooth flanks facing away from each other, and cutting edges, wherein the cutting edges have cutting edges on the tooth flank edges adjoining the end face, wherein in a first method step, tooth gaps that form tooth flanks are produced in the working gear by means of the cutting edges using a machining process in a first position of the tool relative to the working gear, and in a second method step, the working gear tooth flanks produced by the cutting edges are fine-machined by an abrasive tool surface. The invention further relates to a tool for execution of the method with a tool, the main part of which has a multiplicity of teeth that are arranged about an axis of rotation, and which protrude radially from the main part of the tool, the said cutting teeth forming an end face, two tooth flanks facing away from each other, and cutting edges on the edges of the tooth flanks adjoining the end face, for the generation by machining of tooth gaps forming tooth flanks on the working gear. The invention further relates to a device for execution of the method with a tool, in which the electronic control device is programmed accordingly.

BACKGROUND

DE 10 2005 049 528 A1 and DE 10 2009 003 338 A1 describe methods for the machining of workpieces with internal or external tooth forms, wherein the method is a hob skiving method. In the method there described, a rough tooth form is first produced with a cutting tool. This takes place in a roughing operation. Following this first method step, the tooth flanks are deburred in the region of their end face edges. In addition, the prior art includes WO2001/060733 A1, DE10305752 A1 and DE 3930322 C1.

It is of known art to fine-machine the tooth flanks of such rough tooth forms by honing or grinding. In the case of honing, a honing wheel clamped on a honing spindle is used for this purpose, whose honing teeth engage with the tooth forms produced in the working gear. The honing teeth engage in the manner of a meshing gear with the teeth of the working gear. The tool axis of rotation and the working gear axis of rotation have an axis crossing angle relative to each other, so that when sliding the tooth flanks of the working gear and the tool past each other a surface transverse movement takes place, which results in a removal of material from the working gear flank.

SUMMARY

The invention has for its object the further advantageous development of the processing method of known art in its use, and for this purpose to specify a suitable tool and a suitable device.

The object is achieved by the invention specified in the claims, wherein the dependent claims are not only advantageous developments of the invention specified in the coordinate claims, but also represent independent solutions of the task.

First and foremost, it is proposed that the tool has abrasive tooth flanks. With the tool, two production steps of a manufacturing process consisting of a plurality of successive production steps can be executed. This preferably takes place without an intermediate tool change, but simply by an alteration of the position of the tool axis of rotation relative to the workpiece axis of rotation. In a first method step, the cutting edges of the tool are used to produce the tooth forms of the working gear. The production of the tooth forms of the working gear can be carried out in a plurality of successive machining operations, for example in a plurality of successive hob skiving process steps in which initially a rough tooth form, and subsequently a fine tooth form, are generated. However, it is also possible to produce the tooth form in a single hob skiving process step, wherein in particular provision is made for the tooth formation to be executed in a plurality of successive steps with one tool, wherein between the individual steps it is just the distance between the working gear axis of rotation and the workpiece axis of rotation that is changed, so that the tooth gaps generated by the cutting edges are deepened step-by-step. In the case of hob skiving the cutting edges of each cutting tooth engage in a skiving manner with the material of the working gear, wherein a feed of the continuously rotationally driven workpiece spindle relative to the tool spindle of the teeth to be produced is provided in the direction of extent of the teeth. Processing takes place at a first axis crossing angle between the tool axis of rotation and the working gear axis of rotation. The cutting edges are formed by the edge at which the tooth flanks of the cutting tooth transition into an end face of the cutting tooth. The cutting wheel can take the form of a cutting wheel with a step cut or a conical surface cut. However, the cutting wheel can also have a plane end face, in which the end faces of the cutting teeth are also located. In a second process step in accordance with the invention, the tooth flanks of the working gear produced by the cutting edges of the tool are fine-machined. This takes place in accordance with the invention by means of an abrasive tool surface in the manner of a honing process. For this purpose, provision is made for the abrasive tool surfaces to be formed on the tooth flanks of the tool. By an adjustment of the relative position of the tool and working gear these are brought into a second position, which differs from the first position, in which the tooth flanks of the working gear can be surface processed. This takes place essentially by altering the axis crossing angles between the working gear axis of rotation and the tool axis of rotation, and by altering the axial distance, that is to say, by a spatial displacement of the workpiece and/or tool relative to each other. While in the first position, when generating the tooth forms, clearance angles exist between the tooth flanks of the working gear and the tooth flanks of the cutting wheel; in the second position, when fine-machining, the tooth flanks of the tool roll from the tooth flanks of the working gear, so that surface processing of the tooth flanks of the working gear takes place by means of abrasive tool surfaces. The position of the tool relative to the working gear is essentially changed by the alteration of the axis crossing angle, such that the clearance angles required in the first method step disappear, so that the cutting teeth engage in the manner of a meshing gear with the tooth gaps of the working gear. The cutting teeth have a direction of extent relative to the axis of the tool, such that in the second process step, a surface transverse movement takes place between the mutually engaging tooth flanks.

The tool in accordance with the invention for the execution of the above-described method has a main part that has a multiplicity of cutting teeth, arranged about an axis of rotation and protruding radially from the main part of the tool. The said cutting teeth have cutting edges at least on their end faces, wherein the cutting edges run along the edges on which the end faces transition into the tooth flanks of the cutting teeth. In their direction of extent the cutting teeth possess an essentially constant cross-section. The vertex lines laid on the tips of the cutting teeth preferably run on a cylindrical surface. However, it is also envisaged that the vertex lines could run on a truncated conical surface. While the cutting edges are used for machining the tooth gaps of the working gear forming the tooth flanks, the tooth flanks of the tool adjacent to the cutting edges can be used for the fine-machining of the tooth flanks of the working gear generated by the cutting edges. For this purpose, the tooth flanks of the tool are abrasively formed. The tooth flanks of the tool are abrasively formed such that a movement of the tooth flanks of the tool relative to the tooth flanks of the working gear leads to a honing or grinding removal of material from the flank of the tooth of the working gear. The abrasive tooth flank of the tool is preferably formed by a coating. Here it can take the form of a hard material coating. For this purpose, a metallisation can be applied onto the tooth flanks, in which the hard material particles are embedded in a manner of known art. For example, the tooth flanks of the tool are nickel plated. A nickel binding layer is applied onto a nickel base layer, in which binding layer a plurality of hard material particles are embedded; a portion of their surfaces protrude from the metal layer, so as to remove material, in the manner of a dressing tool for honing stones, from the tooth flanks of the working gear. The hard material particles can take the form of boron nitride, aluminium oxide, or diamond particles.

The invention also relates to a device for the execution of the method; in a manner of known art the device possesses at least one workpiece spindle and one tool spindle. The workpiece spindle and the tool spindle can each preferably be rotationally driven by rotary drive units. Here the latter can take the form of servomotors, in particular torque motors, or synchronous motors. In principle, however, it is sufficient for the execution of the method if just one spindle can be rotationally driven by an electric drive. Preferably, however, both spindles, that is to say, the tool spindle and the workpiece spindle, can be rotationally driven by a rotary drive. The two rotary drives are synchronised so that they rotate synchronously. Means are also provided, for example in the form of a cross table, with which the tool can be advanced relative to the working gear, wherein the feed essentially takes place in the direction of extent of the tooth flanks of the working gear. For purposes of generating the feed either the tool or the working gear can be moved relative to a machine frame. Furthermore means are provided by which the axis crossing angle between the tool axis of rotation and the workpiece axis of rotation can be adjusted. All means for adjustment can take the form of stepper motors and/or torque motors. The device has an electronic, programmable controller with which the individual axes of the machine tool can be controlled. The control device is programmed such that the machine tool operates with the above-described tool in accordance with the above-described method.

BRIEF DESCRIPTION OF THE DRAWINGS

In what follows the invention will be described in more detail with the aid of an example of embodiment. Here.

DETAILED DESCRIPTION

Figure 13:
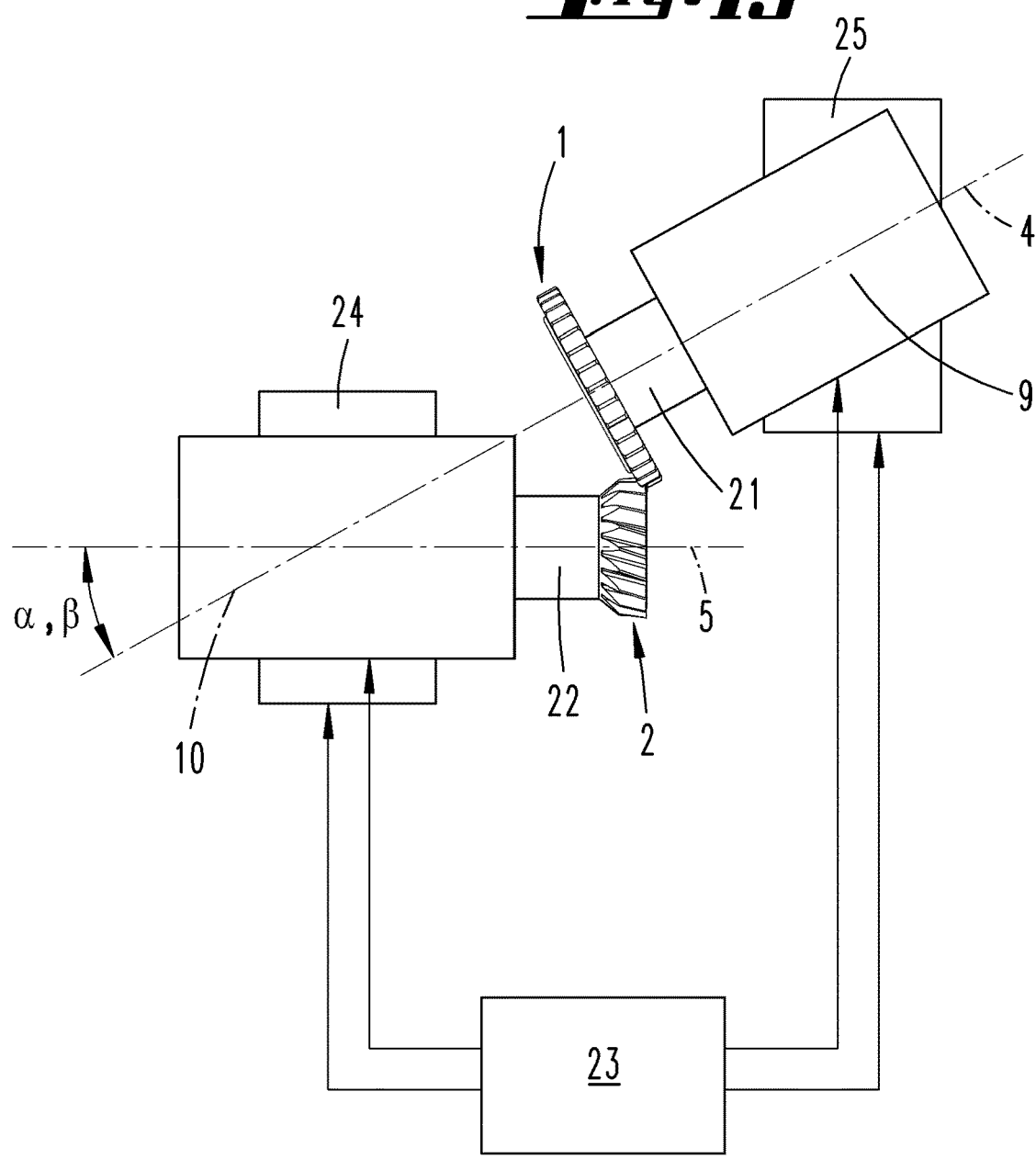
FIG. 13 shows schematically a device for the execution of the method.

FIG. 13 shows very schematically a device for the execution of the method. Devices 24, 25 are fixed on a machine frame, not shown, with which devices a workpiece spindle drive 9 and a tool spindle drive 10 can be adjusted relative to each other. The adjustment is program-controlled by an electronic control device 23. The means of setting and adjustment 24, 25 are able to relocate the relative positions of the workpiece spindle drive 9 and the tool spindle drive 10 relative to each other. A working gear spindle 21 is rotationally driven by the workpiece spindle drive 9; the spindle carries a working gear 1. The working gear 1 is rotationally driven about a working gear axis of rotation 4.

The tool spindle drive 10 drives a tool spindle 22, which carries a gear-form tool 2, which can be rotationally driven about a tool axis of rotation 5.

By means of the means of setting and adjustment 24, 25 the axis crossing angles $\alpha$, $\beta$ of the working gear axis of rotation 4 can be set relative to the tool axis of rotation 5. In addition, a feed can be implemented.

Figure 1:
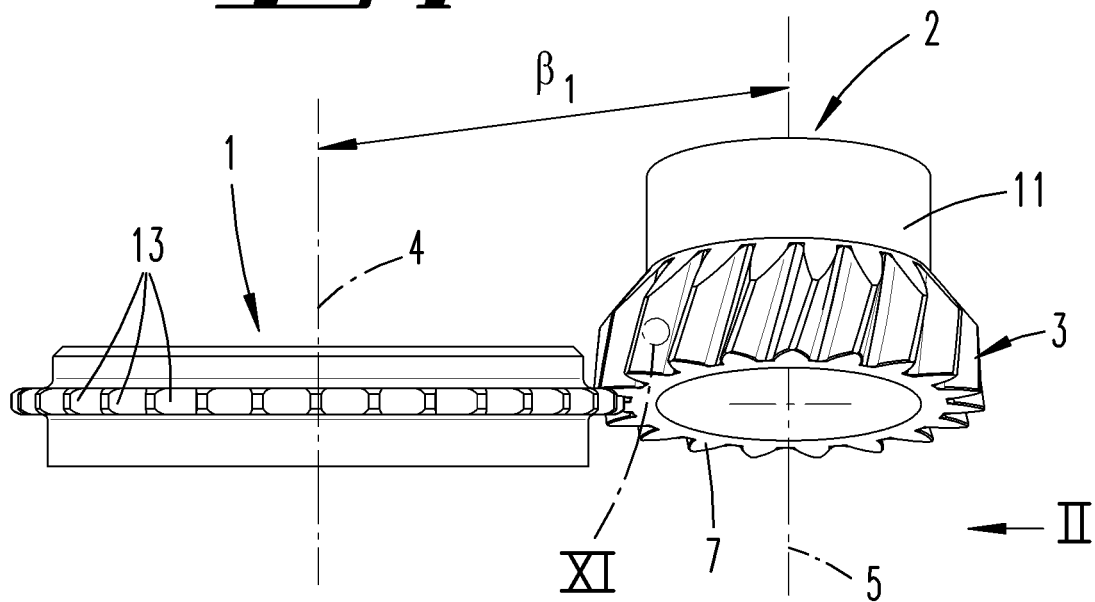
FIG. 1 shows schematically a tool 2 in the form of a gear, whose cutting teeth 3 are in meshing engagement with the teeth of a working gear 1; it illustrates the position of the working gear 1 relative to the tool 2 in a first method step in which a tooth form is generated in the working gear 1.
Figure 2:
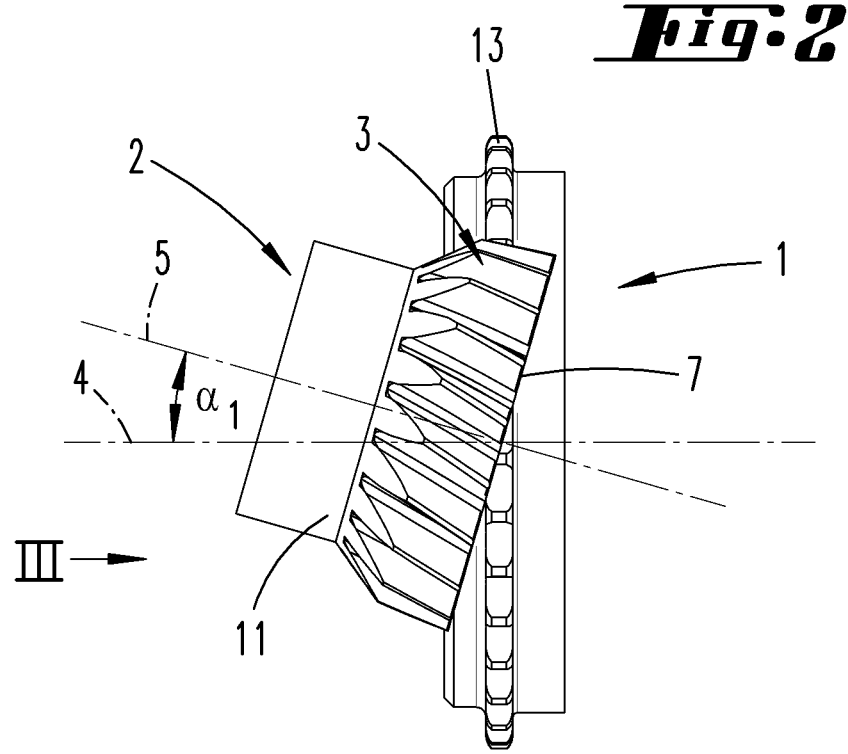
FIG. 2 shows the arrangement as in FIG. 1, but in the viewing direction II as in FIG. 1.
Figure 3:
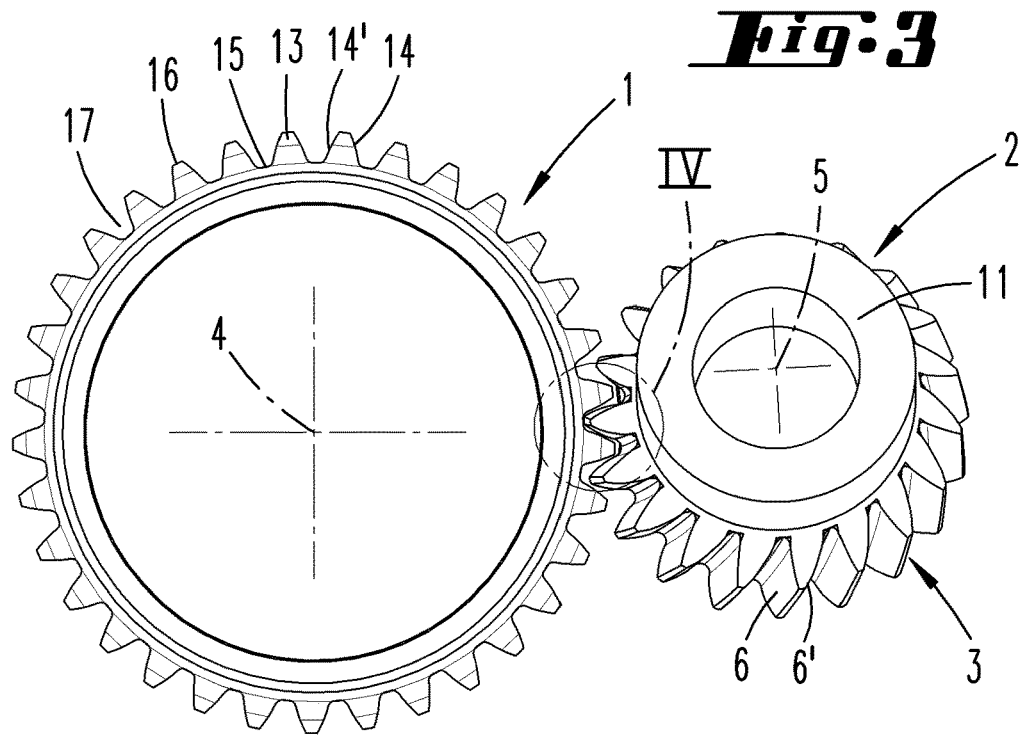
FIG. 3 shows the arrangement in FIG. 1, but in a plan view onto the working gear 1.
Figure 4:
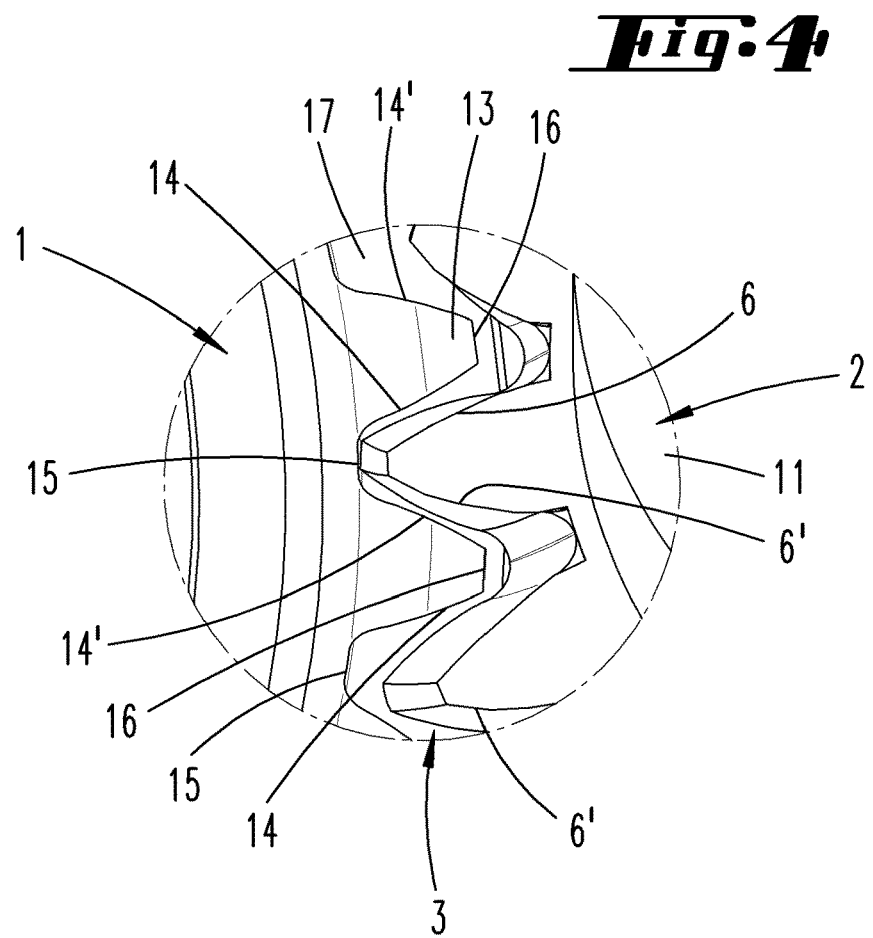
FIG. 4 shows at an enlarged scale the engagement of the cutting teeth 3 shown in FIG. 3 with the tooth gaps 17 between the teeth 13 of the working gear 1; it illustrates the clearance angle between the tooth flanks of the cutting teeth 3 and the teeth 13.
Figure 5:
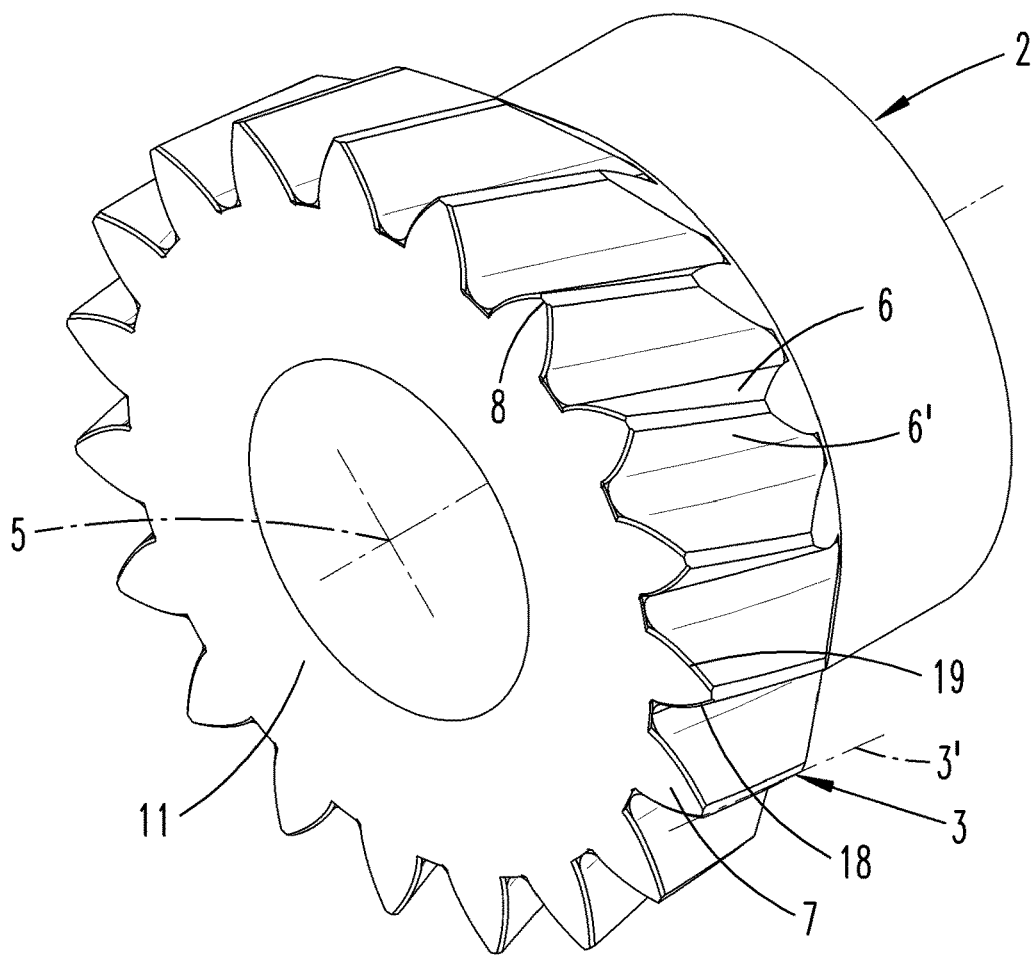
FIG. 5 shows a perspective view of the tool, whose cutting edges 18, 19 are formed by the edges at which the abrasively coated tooth flanks 6, 6' of the cutting teeth 3 meet the end faces 7 of the cutting teeth 3.
Figure 6:
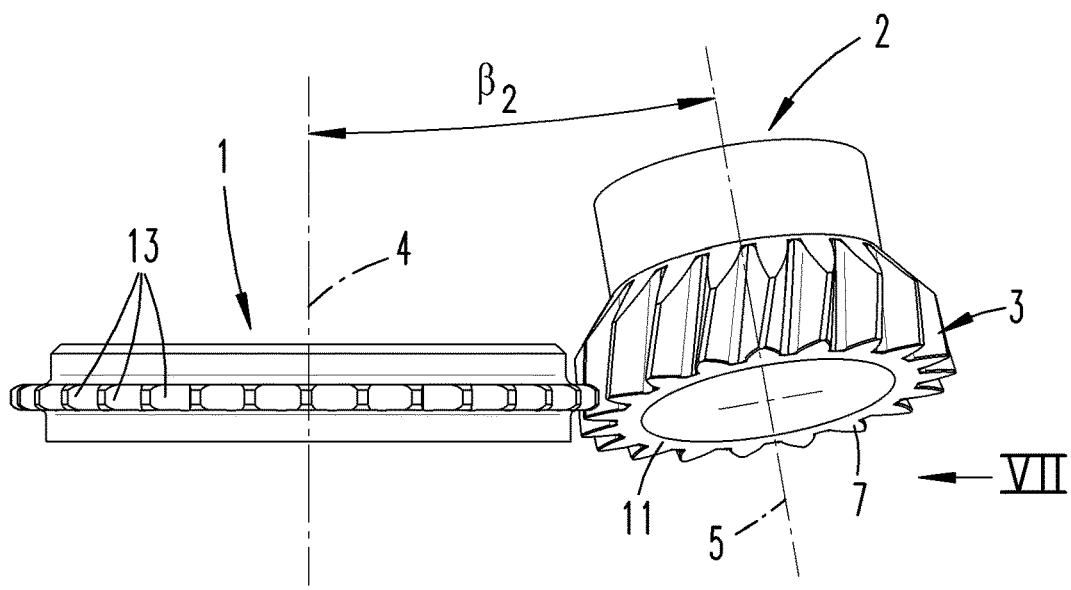
FIG. 6 shows a representation as in FIG. 1, but in a second position in which the axis crossing angle between the working gear axis of rotation 4 and the tool axis of rotation 5 has been altered, and in addition the position of the tool 2 has been displaced in the direction of the tool axis of rotation 5, so that the abrasive tooth flanks 6, 6' can process the tooth flanks 14, 14' of the tooth forms of the working gear 1.
Figure 7:
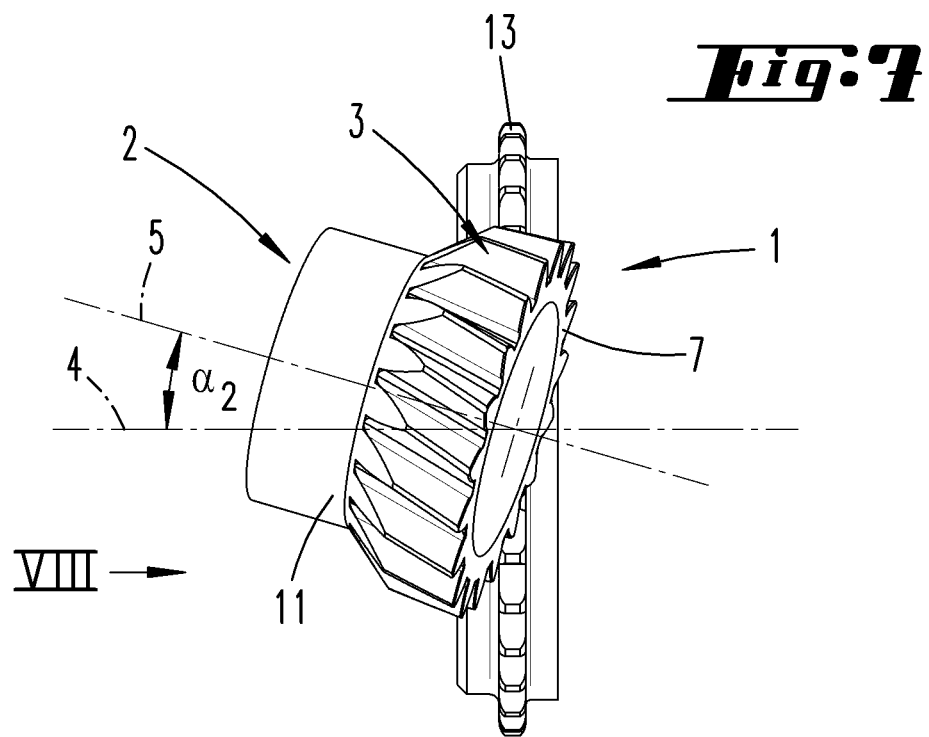
FIG. 7 shows a representation as in FIG. 2, but in the second position.
Figure 8:
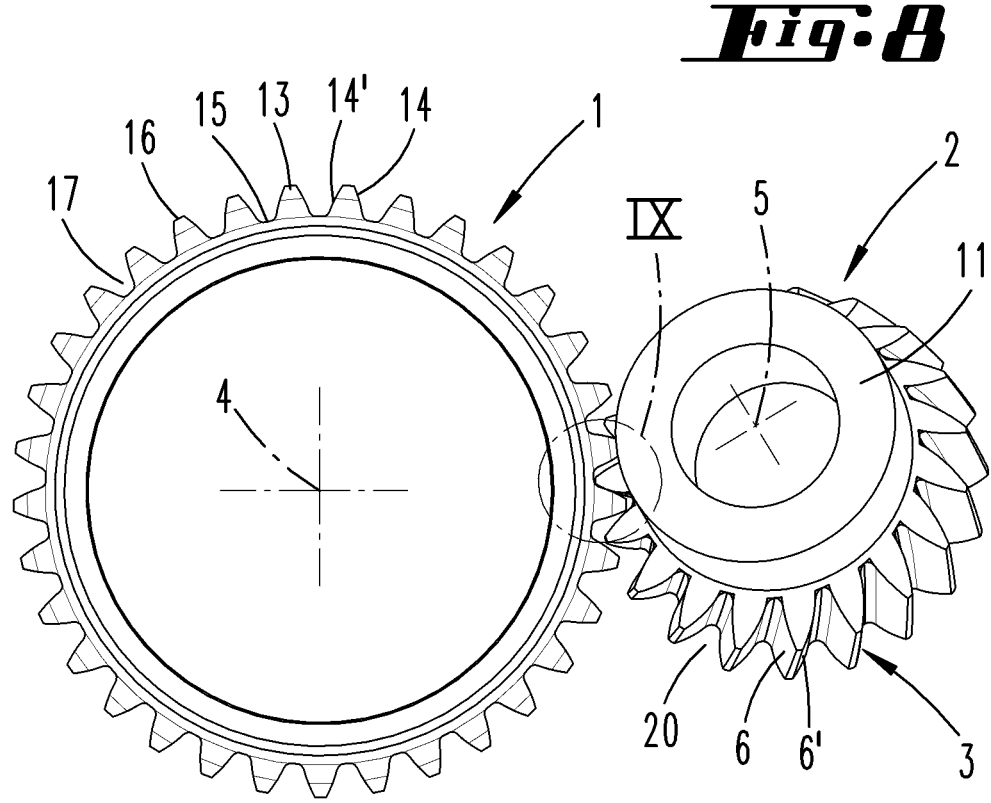
FIG. 8 shows a representation as in FIG. 3, but in the second position.

The tool shown in FIG. 5 has a tool main part 11, which can be clamped on a tool spindle 22 in order to drive the tool main part 11 about the tool axis of rotation 5.

From the tool main part 11 a plurality of cutting teeth 3 protrude in the radial direction relative to the tool axis of rotation 5. The cutting teeth 3 possess a constant cross section over their entire axial extent. In the embodiment, the vertex line 3' drawn through the tooth heads 8 of the cutting teeth runs at an angle to the tool axis of rotation 5. The vertex lines 3' can lie on a cylindrical surface about the tool axis of rotation 5 or on a truncated conical surface about the tool axis of rotation 5. Depending on the processing task, the cutting teeth 3 preferably extend in a uniform angular distribution about the tool axis of rotation 5.

Each of the cutting teeth 3 possesses an end face 7, which with the formation of an edge intersects two tooth flanks 6, 6' of the cutting tooth 3 facing away from each other in the circumferential direction. The edge forms cutting edges 18, 19. In the embodiment, one cutting edge 19 is formed by a groove and the opposing cutting edge is formed by a chamfer, so that both cutting edges of the oblique cutting teeth 3 can cut into the workpiece with the same rake angle, although the end face 7 is a surface radial to the tool axis of rotation 5.

In an alternative embodiment, the edges between the end face 7 and the tooth flanks 6, 6' run at right angles or at acute angles. The end face of the cutting tool 2 then possesses a step cut.

The tooth flanks 6, 6' are abrasively formed. For this purpose, provision is made in particular for the tooth flanks 6, 6' to carry a metal layer 28, in particular a nickel layer, in which hard material particles 27, in particular diamond particles, are embedded, which protrude with surface sections out of the metal layer 28 in order to generate an abrasive action. The metal layer 28 can be a binding layer that has been deposited on a substrate layer 26 applied directly onto the steel main body of the tooth flank 14. The substrate layer 26 and the binding layer 28 can be galvanically applied metal layers, in particular nickel layers.

With the tool 2 in accordance with the invention, it is possible, in a first process step, which is shown in FIGS. 1 to 4, to incorporate a toothed form into a working gear 1 with no tooth form, or with a rough tooth form, or with a rough initial tooth form. This takes place in a first roughing step, which can also be followed by a fine-machining step, in which the cutting edges 18, 19 enter into the working gear 1 with a lower feed and a lower cutting power.

In accordance with the invention, the first process step illustrated in FIGS. 1 to 4, in which the tooth form is produced, is followed by the second process step shown in FIGS. 6 to 10, in which the tooth flanks 14, 14' of the working gear 1 are fine-machined with the same tool 2, not with its cutting edges 18, 19, but instead with the abrasively equipped tooth flanks 6, 6'.

In the first method step, illustrated in FIGS. 1 to 4, the tool spindle 22 is presented to the workpiece spindle 21 at an axis crossing angle $\alpha_1$, $\beta_1$ such that with a synchronised rotation of the workpiece spindle 21 and the tool spindle 22 and a feed in the direction of extent of the teeth 13 of the working gear 1 a skiving process takes place, during which the tooth flanks 14, 14' of the tooth gaps 17 are generated between the teeth 13 of the working gear 1. Here the tooth flanks 6, 6' of the tool have a wedge-shaped separation distance from the tooth flanks 14, 14' of the teeth 13 of the working gear 1. This clearance angle can be seen in FIG. 6.

In the first process step, the tooth gaps 17 can be deepened in a step-by-step manner.

Figure 9:
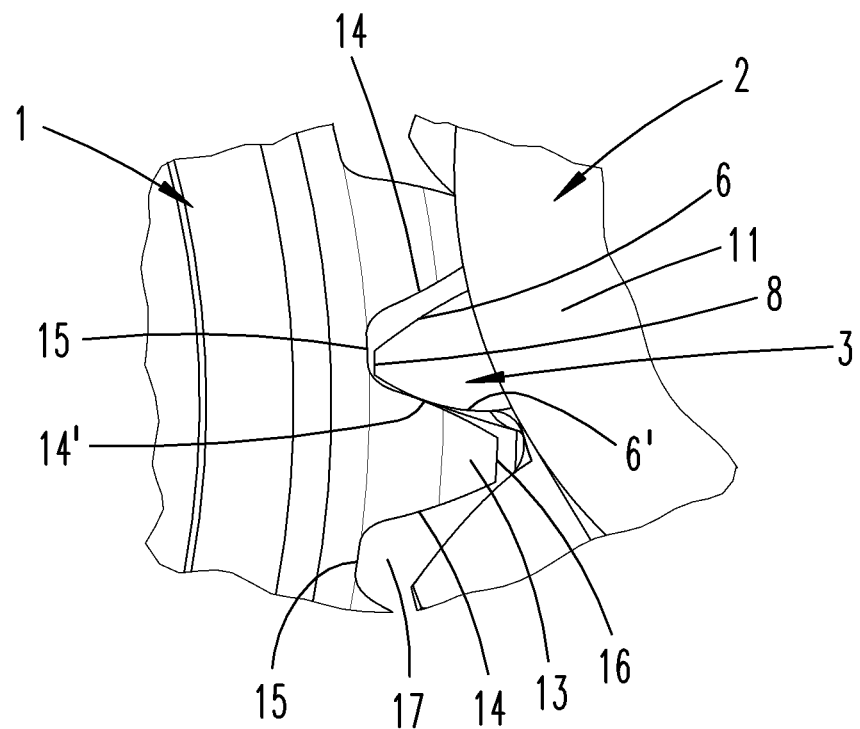
FIG. 9 shows the detail IX in FIG. 8 so as to clarify the engagement of the cutting tooth 3 with the tooth gaps 17 between the teeth 13 of the working gear 1, wherein no clearance angle is present between the tooth flanks 6, 6' of the cutting teeth 3 and the tooth flanks 14, 14' of the teeth 3 of the working gear 1, but an abrasively formed tooth flank 6' of the cutting tooth 3 engages in surface contact with the tooth flank 14' of a tooth 13 of the working gear 1.

In a second process step, which preferably follows immediately after the first process step, and which is shown in FIGS. 6 to 10, tooth flank processing of the tooth flanks 14, 14' takes place. For this purpose, the axis crossing angle, and/or the spatial location of the tool relative to the workpiece, is altered. In the second position, for the execution of the second method step, the axis crossing angles $\alpha_2$, $\beta_2$ are set such that the clearance angle between the tooth flanks 6, 14, and 6', 14' respectively, disappears. FIG. 9 shows that an abrasively coated tooth flank 6' of the cutting tooth 3 is in surface contact with the tooth flank 14' of a tooth 13 of the working gear 1. In the second process step, if the gear-form cutting tool 2 and the toothed working gear 1 are rotated relative to one another with intermeshing teeth, the tooth flanks 6' roll from the tooth flanks 14'. On account of the axis crossing angles $\alpha_2$, $\beta_2$ a grinding movement takes place. A surface transverse movement occurs, such that the abrasive particles of the tooth flank 6' remove material from the tooth flank 14'.

Figure 10:
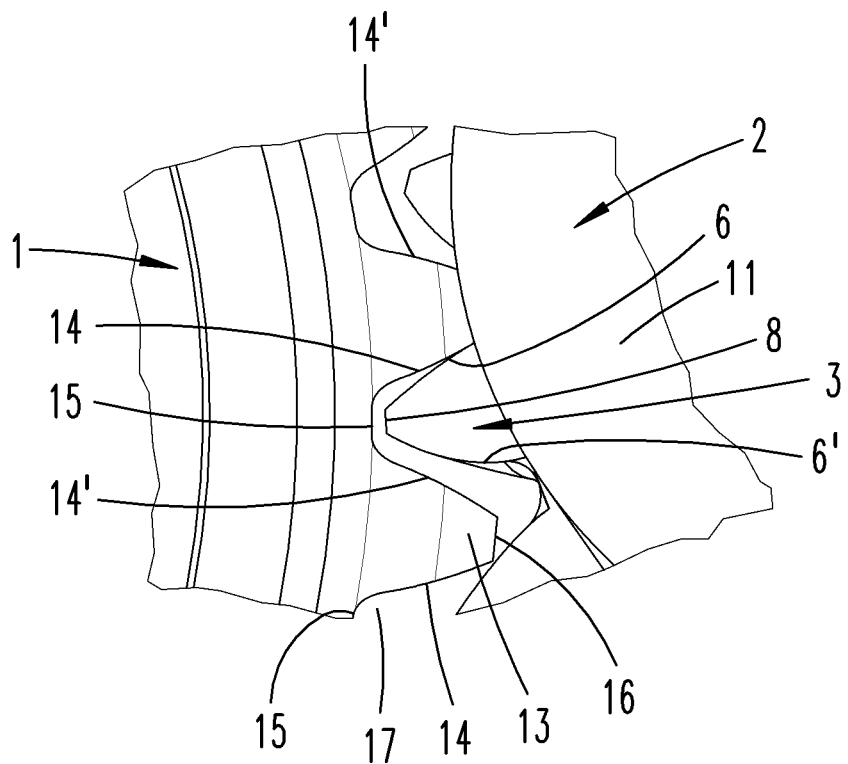
FIG. 10 shows a representation as in FIG. 9, but after the working gear 1 and the tool 2 have been slightly further rotated, so that the abrasively formed tooth flank 6 of the cutting tooth 3 is in surface contact with the tooth flank 14 of a neighbouring tooth of the working gear 1.
Figure 11:
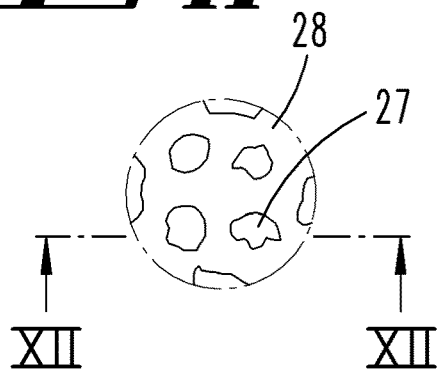
FIG. 11 shows at an enlarged scale the detail XI in FIG. 1.
Figure 12:
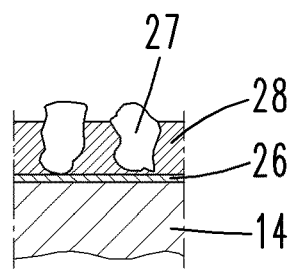
FIG. 12 shows the section XII-XII in FIG. 11.

FIG. 10 shows an operating position that directly follows the operating position shown in FIG. 9 if the two intermeshing gear-form bodies of the working gear 1 and the tool 2 have been slightly further rotated. In the manner of a meshing gear, the tooth flank 6, located opposite the tooth flank 6' and similarly abrasively coated, engages with the tooth flank 14 of the working gear 1, located opposite the tooth flank 14', so as to fine-machine the latter by the abrasive removal of material.

The above statements serve to explain the inventions recorded as a whole by the application, which develop the state of the art at least by the following combinations of features, and also independently, namely:

A method, which is characterised in that the abrasive tool surfaces are formed by the tooth flanks 6, 6' of the tool 2, which in the second method step operates on the working gear 1 in a second position, which differs from the first position.

A method, which is characterised in that in the first position the tooth flanks 6, 6' of the tool 2 have a clearance angle relative to the tooth flanks 14, 14' of the working gear 1.

A method, which is characterised in that in the second position for surface processing the tooth flanks 6, 6' of the tool 2 roll from the tooth flanks 14, 14' of the working gear 1.

A method, which is characterised in that the tool axis of rotation 5 and the working gear axis of rotation 4 assume different axis crossing angles $\alpha_1$, $\beta_1$, $\alpha_2$, $\beta_2$ in the two positions.

A method, which is characterised in that the first process step is a hob skiving process.

A method, which is characterised in that the second process step is a process step similar to honing, wherein the cutting teeth 3 engage in the manner of a meshing gear with the tooth gaps 17 of the working gear 1.

A method, which is characterised by a surface transverse movement as determined by the axis crossing angles $\alpha_2$, $\beta_2$ of the tooth flanks 6', 14', 6, 14, which engage with each other in the second process step.

A tool, which is characterised in that the tooth flanks 6, 6' of the tool 2 are abrasively formed for the fine-machining of the tooth flanks 14, 14' of the working gear 1 generated by the cutting edges 18, 19.

A tool, which is characterised in that the tooth flanks 6, 6' of the tool 2 are abrasively coated, and in particular have a hard material coating 26 to 28.

A tool, which is characterised in that the tooth flanks 6, 6' of the tool 2 have hard material particles 27, in particular boron nitride, aluminium oxide, or diamonds, embedded in a metal layer 28, in particular a nickel layer.

A tool, which is characterised in that the direction of extent of the cutting teeth 3 runs at an angle to the axis of rotation 5.

A tool, which is characterised in that a vertex line 3' of the cutting teeth 3 runs on a truncated conical surface, or a cylindrical surface, about the axis of rotation 5.

A device, which is characterised in that the control device 23 is equipped such that in a first step in a first position of the tool 2 relative to the working gear 1 tooth flanks 14, 14' forming tooth gaps 17 in the working gear 1 are produced with the cutting edges 18, 19 by means of a machining process, and in a second method step, the tooth flanks 14, 14' of the working gear 1 generated by the cutting edges 18, 19 are fine-machined by an abrasive tool surface, which is formed by the tooth flanks 6, 6' of the tool 2, wherein the second process step is performed in a second position that differs from the first position.

All disclosed features are essential to the invention (both individually, and also in combination with one another). In the disclosure of the application, the disclosure content of the associated/attached priority documents (transcript of the prior application) is hereby also incorporated in full, also for the purpose of incorporating features of these documents in the claims of the present application. The subsidiary claims characterise with their features independent inventive developments of the prior art in particular in order to make divisional applications on the basis of these claims.

The invention claimed is:

1. A method for cutting teeth into a working gear using a tool, said tool includes a main part having a multiplicity of cutting teeth which are arranged about an axis of rotation and which protrude radially from the main part of the tool, said cutting teeth form an end face, two tooth flanks facing away from each other, and cutting edges, wherein the cutting edges are formed by edges of the tooth flanks adjoining the end face, the method comprising:
   in a first step in a first position of the tool relative to the working gear tooth flanks forming tooth gaps in the working gear are produced with the cutting edges by means of a machining process, and
   in a second step, the tooth flanks of the working gear produced by the cutting edges are fine-machined by abrasive tool surfaces,
   wherein the abrasive tool surfaces are formed by the tooth flanks of the tool, which in the second step operates in a second position, which differs from the first position relative to the working gear,
   wherein the abrasive tool surfaces of the tool comprise hard material particles which are embedded in a metal layer and protrude with surface sections out of the metal layer, wherein the metal layer is a galvanic coating on the tooth flanks of the tool.

2. The method in accordance with claim 1, wherein, in the first position the tooth flanks of the tool have a clearance angle relative to the tooth flanks of the working gear.

3. The method in accordance with claim 2, wherein, in the second position for surface processing the tooth flanks of the tool roll from the tooth flanks of the working gear.

4. The method in accordance with claim 2, wherein, the axis of rotation of the tool and an axis of rotation of the working gear assume different axis crossing angles $\alpha_1$, $\beta_1$, $\alpha_2$, $\beta_2$ in the two positions.

5. The method in accordance with claim 2, wherein, wherein the cutting teeth engage in the manner of a meshing gear with the tooth gaps of the working gear.

6. The method in accordance with claim 1, wherein, in the second position for surface processing the tooth flanks of the tool roll from the tooth flanks of the working gear.

7. The method in accordance with claim 1, wherein, the axis of rotation of the tool and an axis of rotation of the working gear assume different axis crossing angles $\alpha_1$, $\beta_1$, $\alpha_2$, $\beta_2$ in the two positions.

8. The method in accordance with claim 7, whereby a surface transverse movement of the tooth flanks of the tool and the working gear is determined by the axis crossing angles, which engage with each other in the second step.

9. The method in accordance with claim 1, wherein, the first step is a hob skiving process.

10. The method in accordance with claim 1, wherein, the cutting teeth engage in the manner of a meshing gear with the tooth gaps of the working gear.

11. The method in accordance with claim 10, wherein, the second step comprises a honing process.

12. The method in accordance with claim 1, whereby a surface transverse movement of the tooth flanks of the tool and the working gear is determined by axis crossing angles, which engage with each other in the second step.

13. A device for cutting teeth into a working gear comprising:
   a tool, wherein the tool includes a main part, which has a multiplicity of cutting teeth arranged about an axis of rotation and protruding radially from the main part of the tool, said cutting teeth have an end face, two tooth flanks facing away from each other, and cutting edges on edges of the tooth flanks adjacent to the end face for generation by machining of tooth gaps forming tooth flanks on the working gear, wherein, the tooth flanks of the tool have abrasive tool surfaces for fine-machining of the tooth flanks of the working gear generated by the cutting edges, the abrasive tool surfaces comprise hard material particles which are embedded in a metal layer and protrude with surface sections out of the metal layer, wherein the metal layer is a galvanic coating on the tooth flanks of the tool,
   a tool spindle that is rotatable about a tool axis of rotation,
   a workpiece spindle that is rotatable about a workpiece axis of rotation, at least one of the spindles is rotatably driven by at least one rotary drive means, with means for generating a feed of the tool relative to the working gear and means for adjusting an axis crossing angle between the tool axis of rotation and the workpiece axis of rotation, and
   an electronic control device for controlling the at least one rotary drive means, and the means for generating the feed and adjusting the axis crossing angle, wherein the control device is equipped in a first step to adjust the axis crossing angle so that the tool spindle and the workpiece spindle arrange the tool in a first position relative to the working gear in order for the tooth gaps forming the tooth flanks to be produced in the working gear using the cutting edges by the machining process, and wherein the control device is equipped in a second step to adjust the axis crossing angle so that the tool spindle and the workpiece spindle arrange the tool in a second position relative to the working gear in order for the tooth flanks of the working gear generated by the cutting edges to be fine-machined by the abrasive tool surfaces of the tooth flanks of the tool, wherein the second position differs from the first position.

14. The device in accordance with claim 13, wherein the at least one rotary drive means comprises a first rotary drive means and a second rotary drive means, the first rotary drive means configured to drive the tool spindle and the second rotary drive means configured to drive the workpiece spindle.

15. The device in accordance with claim 13, wherein the metal layer is a binding layer that has been deposited on a substrate layer, which is applied directly onto a steel main body of the working gear tooth flanks.

\* \* \* \* \*